Patented Dec. 29, 1953

2,664,370

UNITED STATES PATENT OFFICE 2,664,370

SOLDERING FLUX

Chester A. Snell, New York, and Jacob M. Fain and John A. De Rosa, Brooklyn, N. Y., assignors to the United States of America as represented by the Secretary of the Army No Drawing. Application December 20, 1951, Serial No. 262,651

3 Claims. (Cl. 148—23)

This invention relates to soldering fluxes and more particularly to soldering fluxes adapted for use in soft soldering on all metals and suitable both as an external flux and for inclusion in the hollow core of solder wire.

In soldering metals or any combination of metals, particularly stainless steel or aluminum or alloys containing aluminum, the basic difficulty to be overcome is the removal of an oxide film which is formed on the surface of the metal and which therefore interferes with a wetting of the underlying metal by the solder. In order to establish a metal to metal contact between the metal being soldered and the solder, the oxide film must be removed either mechanically or chemically. The function of the flux is its use as a chemical means for removing the oxide film.

One of the important properties which characterizes a good flux is that it should only superficially attack the metal and yet loosen the oxide film and dissolve or otherwise displace any loosened oxide particles. Another highly desirable property in a flux is the ability to cause a spreading of the solder over the prepared surface. Still another required property which is important, especially in situations where there are delicate metal surfaces to be soldered such as in radio and electrical equipment, is that the flux should not leave a corrosive residue. Such residues tend to promote electrolytic corrosion between the solder and the metal and may thus cause ultimate failure of the joint under unfavorable atmospheric conditions. Furthermore, in many cases, it is difficult and impracticable to wash off or otherwise remove the flux residue. Hence considerable effort has been made to provide flux compositions that leave non-corrosive residues or no residue at all.

Some soldering fluxes in commercial use are those which evolve on acid gas when heated in the air to the temperature at which ordinary solder is applied to parts in soldering. These fluxes frequently react with moisture in the air after the soldering operation is completed to produce an acid which corrodes the soldered parts, this corrosion continuing until all of the flux remaining on the parts is hydrolyzed.

Heretofore, it has been found that the use of organic compounds such as rosin with amine additives have had some effect in overcoming the abovementioned difficulties in soldering. Boron trifluoride addition products have been quite satisfactory in this respect. They promote the spread of molten solder and they attack the metal surface uniformly without the danger of excessive pitting or perforation in the case of very thin sheet metal.

It has also been found, heretofore, that many halogen and cyanogen derivatives of various carbon compounds are stable and non-corrosive at ordinary temperatures and that these compounds when heated to soldering temperatures evolve gases which are very effective fluxing agents. Naphthaline tetrachloride and similar poly-halogen derivatives of cyclic hydrocarbons are stable at ordinary temperatures and are not hydrolyzed by the moisture contained in the atmosphere but when heated to about 200° C., they evolve dry hydrogen chloride or other dry hydrogen halide gas. Dry hydrogen chloride gas is very effective in cleaning and preparing the surfaces of parts to be soldered and no corrosion of the joint takes place subsequent to the soldering operation.

However, so far as we are aware, the fluxes in commercial use do not possess the properties necessary to fulfill the combined requirements of applicability for use on all metals, strong activity, and non-corrosiveness.

It is therefore a primary object of the present invention to provide an active soft soldering flux which can be used in soft soldering on all metals, particularly on stainless steel and aluminum.

A further object is to provide a soft soldering flux which is substantially non-corrosive.

A still further object is to provide a flux suitable both for use as an external flux and for inclusion in the hollow core of solder wire.

These and other objects and advantages of the present invention will be better understood as the detailed description thereof progresses.

This invention is based upon the finding that the incorporation in a resin base of a boron trifluoride addition product of an amine or hydroxy amine, and a polyhalogen derivative of a cyclic hydrocarbon will result in a flux adaptable for use in soft soldering on all metals and will fulfill all objects as outlined hereinabove. A plasticizer is added in varying amounts depending upon the degree of hardness and plasticity desired in the flux composition.

The resin base can include any resin that ordinarily has some fluxing properties of its own. Examples of this include rosin, rosin modified maleic ester resins (Teglac resins), abietic acid, hydrogenated resin (Staybelite) and Nuroz. Of the resins mentioned immediately supra, Nuroz is a trade name for partially polymerized pale wood rosins, and Staybelite is a trade name for hydrogenated rosins characterized by resistance to oxidation and discoloration. When properly plasticized, such a resin base serves the main functions of a vehicle and diluent for the more active constituents and of a protective coating for their residues when exposed to unfavorable atmospheric conditions.

The plasticizer serves the functions of not only plasticizing the resin, but also dissolving the more active constituents. Glycol ethers are a class of solvents most suitable to use for this purpose. Examples of these are ethylene glycol monoethyl ether (cellosolve) and ethylene glycol monobutyl ether (butyl cellosolve). Such a solvent, being of high molecular weight and low volatility at ordinary temperatures is preferable as a composition containing it has less tendency to dry out when exposed to the open air.

The boron trifluoride addition products suitable for such compositions can be made from boron trifluoride etherate (ethyl ether addition product of boron trifluoride) and various amines or hydroxy-amines in equimolecular proportions. Any amine or hydroxy-amine is suitable, provided it contains cyclic hydrocarbon groups, such groups being important for rendering the addition products miscible with the resins and plasticizers. Examples of such amines are diphenylamine, diphenylguanidine, and phenyl diethanol amine.

The most effective halogen product for improving fluxing properties is tetrachloro naphthalene (naphthalene tetrachloride). The main function of this is to evolve dry hydrogen chloride gas under soldering heat, thus increasing the chemical activity of the flux material.

It is preferable to limit the boron trifluoride addition product to about 10% to 12% of the total weight. The proportion of tetrachloro-naphthalene can vary from about 3.5% to 8%; the resin can comprise from about 55% to 75%; and the plasticizer content can generally be placed at 10% to 30% of the total weight. Such compositions can vary from a clear light brown plastic solid to an opaque yellow paste. Plasticities can be adjusted by the plasticizer content within the above mentioned limits, depending upon what consistency is required.

As an example of a plastic solid, the following composition and method of preparation can be given.

Nuroz, 73.5%
Tetrachloro-naphthalene, 4.5%
Diphenyl guanidine, 9.0%
Boron trifluoride, 3.0% (commercial boron trifluoride etherate contains 48% of boron trifluoride by weight)
Butyl cellosolve, 10%

The method of preparing the above composition is as follows. Boron trifluoride etherate is added slowly to the amine, during which time there is considerable effervescence and ether is evolved. When all the boron trifluoride has been added, the mixture is carefully heated until all the ether is removed. The above product is then dissolved in butyl cellosolve and the tetrachloro-naphthalene is dissolved in the resulting solution, with the use of additional heat. The latter hot solution is combined with molten rosin and the combination is held at about 120° C. accompanied by stirring and additional heating until a clear liquid is obtained. This final liquid, which is the flux composition is then ready for putting into hollow solder wire or it can be stored by pouring it into a container, whereupon the plastic solid forms on cooling. It is only necessary to heat the final flux product at about 100° C. to obtain a thin liquid.

As an example of a paste flux, the following composition and method of preparation can be given.

Rosin, 59.5%
Tetrachloro-naphthalene, 3.6%
Diphenyl guanidine, 7.3%
Boron trifluoride, 2.6%
Butyl cellosolve, 27%

The method of preparing the above composition is as follows. Boron trifluoride etherate is added slowly to the amine, during which time there is considerable effervescence and ether is evolved. When all the boron trifluoride etherate has been added, the mixture is carefully heated until all the ether is removed. The product is dissolved in butyl cellosolve, and then the tetrachloro-naphthalene is also dissolved in this solution with the use of additional heat. The resulting hot solution is combined with molten rosin and the combination is held at about 120° C. accompanied by stirring and additional heating until a clear liquid is obtained. The paste is formed from this hot liquid by first rapidly cooling the latter in a water bath to about 50° C., leaving it undisturbed during the cooling and then vigorously and constantly stirring the liquid while its temperature is further lowered to about room temperature (25° C.–30° C.). The walls of the container are scraped during the stirring to remove the first precipitate formed. A smooth, fairly firm paste is thus obtained and is ready for use as an external flux. After any entrapped air bubbles are removed, the paste can also then be used for filling hollow solder wire.

The combination of a resin flux with a boron trifluoride product presents a unique product as far as universality is concerned. Without boron trifluoride, there would not be action on stainless steel and aluminum, except by prior abrasion of these metals during soldering.

The combination of the boron trifluoride etherate with an alkaline substance, such as an amine (diphenyl guanidine for example) or a hydroxy amine (phenyl diethanol amine for example) is very stable and ether is easily removed from such a combination by heat. The alkaline amine substances used should be those that contain cyclic hydrocarbon groups as the latter are important to render the boron trifluoride products miscible with the resins and plasticizer.

The addition of naphthalene tetrachloride to such a flux composition causes a greatly increased activity on stainless steel and aluminum. This constituent with the aid of the boron trifluoride products provides the active factor in soldering stainless steel because of the evolution of hydrogen chloride in the soldering process and the boron trifluoride product is responsible for effective soldering action on aluminum.

The functions of the resin in a flux composition are mainly to extend the activity of the flux by dilution thus rendering its action more uniform and to provide a protective cover against air oxidation during soldering. The resin also aids to a great extent in providing a moisture repellent coating in the residues.

While there have been described what at present are considered to be preferred embodiments of the invention, it will be understood by those skilled in the art that various changes and modifications may be made herein without departing from the invention and it is therefore aimed in

What is claimed is:

1. A plastic soldering flux consisting essentially of about 73% by weight of rosin, 5.0% by weight of tetrachloro-naphthalene, 9.0% by weight of diphenyl guanidine, 3.0% by weight of boron trifluoride and 10% by weight of ethylene glycol monobutyl ether.

2. A paste soldering flux consisting essentially of about 60% by weight of rosin, 4% by weight of tetrachloro-naphthalene, 7.0% by weight of diphenyl guanidine, 3.0% by weight of boron trifluoride and 26% by weight of ethylene glycol monobutyl ether (butyl cellosolve).

3. A soldering flux consisting essentially of about 10% to 12% by weight of a boron trifluoride addition product of an amine selected from the group consisting of diphenyl amine, diphenyl guanidine and phenyl diethanol amine, 3.5% to 8% by weight of tetrachloro-naphthalene, 55% to 75% by weight of a resin selected from the group consisting of rosin, hydrogenated rosins, rosin modified maleic ester resins and abietic acid, and 10% to 30% by weight of a glycol ether.

CHESTER A. SNELL.
JACOB M. FAIN.
JOHN A. DE ROSA.

References Cited in the file of this patent

UNITED STATES PATENTS

| Number | Name | Date |
|---|---|---|
| 1,838,370 | Dean et al. | Dec. 29, 1931 |
| 1,989,557 | Muller | Jan. 29, 1935 |
| 2,117,649 | Boyle | May 17, 1938 |
| 2,238,069 | Miller | Apr. 15, 1941 |
| 2,291,400 | Miller | July 28, 1942 |

FOREIGN PATENTS

| Number | Country | Date |
|---|---|---|
| 471,202 | Great Britain | Aug. 31, 1937 |